(12) United States Patent
Ohashi

(10) Patent No.: US 8,098,899 B2
(45) Date of Patent: Jan. 17, 2012

(54) LANDMARK SEARCH SYSTEM FOR DIGITAL CAMERA, MAP DATA, AND METHOD OF SORTING IMAGE DATA

(75) Inventor: Yousuke Ohashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 1402 days.

(21) Appl. No.: 11/594,127

(22) Filed: Nov. 8, 2006

(65) Prior Publication Data

US 2007/0110316 A1    May 17, 2007

(30) Foreign Application Priority Data

Nov. 14, 2005  (JP) ................. 2005-328823
Nov. 16, 2005  (JP) ................. 2005-332042

(51) Int. Cl.
    *G06K 9/00*     (2006.01)
(52) U.S. Cl. ....................................... 382/113
(58) Field of Classification Search .............. 382/113
    See application file for complete search history.

(56) References Cited

U.S. PATENT DOCUMENTS

| | | | | |
|---|---|---|---|---|
| 6,636,802 | B1* | 10/2003 | Nakano et al. ................ | 701/208 |
| 6,882,350 | B2* | 4/2005 | Asami ........................... | 345/638 |
| 7,158,151 | B2* | 1/2007 | Asami ........................... | 345/629 |
| 7,447,418 | B2* | 11/2008 | Nishio et al. .................. | 386/227 |
| 7,711,478 | B2* | 5/2010 | Gluck ........................... | 701/208 |
| 2001/0040629 | A1* | 11/2001 | Miyagi et al. ................. | 348/232 |
| 2004/0145663 | A1* | 7/2004 | Nishio et al. .................. | 348/239 |
| 2004/0189816 | A1* | 9/2004 | Nakazawa et al. ........ | 348/211.2 |
| 2004/0223191 | A1* | 11/2004 | Murata et al. ................ | 358/451 |
| 2005/0156945 | A1* | 7/2005 | Asami ........................... | 345/619 |
| 2005/0162444 | A1* | 7/2005 | Asami ........................... | 345/619 |
| 2005/0271352 | A1 | 12/2005 | Youkouchi | |
| 2005/0273725 | A1* | 12/2005 | Russon et al. ................. | 715/780 |
| 2006/0001757 | A1* | 1/2006 | Sawachi ................... | 348/333.12 |
| 2006/0195858 | A1* | 8/2006 | Takahashi et al. .............. | 725/19 |
| 2007/0067104 | A1* | 3/2007 | Mays ............................ | 701/211 |

(Continued)

FOREIGN PATENT DOCUMENTS

JP      2001-157098      6/2001

(Continued)

OTHER PUBLICATIONS

Japanese Office Action dated May 17, 2010 with English-language translation.
Japanese Office Action dated Jan. 7, 2011, with English translation.

*Primary Examiner* — Aaron W Carter
(74) *Attorney, Agent, or Firm* — McGinn IP Law Group, PLLC

(57) ABSTRACT

In a camera location landmark search system, when an image is captured by a digital camera, a GPS calculator calculates position data indicating a camera position. The position data and image data of the captured image are memorized in association with each other. Map data is divided at regular intervals of latitude and longitude into a lot of areas. Based on the position data, a divisional area including the camera position is selected with reference to a divisional area index table of the map data, and landmark data prepared for the determined divisional area are retrieved from a landmark data table of the map data. Based on the landmark data, a landmark corresponding to the camera position is determined, and the landmark name is memorized in association with the image data. The image data as sorted according to the landmark names may be displayed with the landmark names.

21 Claims, 14 Drawing Sheets

U.S. PATENT DOCUMENTS

| | | | | |
|---|---|---|---|---|
| 2007/0083324 | A1* | 4/2007 | Suzuki et al. | 701/201 |
| 2007/0097460 | A1* | 5/2007 | Kawai | 358/500 |
| 2007/0110316 | A1* | 5/2007 | Ohashi | 382/195 |
| 2007/0165279 | A1* | 7/2007 | Ohashi et al. | 358/1.18 |
| 2007/0273758 | A1* | 11/2007 | Mendoza et al. | 348/39 |
| 2010/0176987 | A1* | 7/2010 | Hoshizaki | 342/357.02 |
| 2010/0259641 | A1* | 10/2010 | Fujimoto | 348/231.3 |
| 2011/0010241 | A1* | 1/2011 | Mays | 705/14.49 |
| 2011/0085057 | A1* | 4/2011 | Takahashi | 348/231.3 |

FOREIGN PATENT DOCUMENTS

| | | |
|---|---|---|
| JP | 2001-169164 | 6/2001 |
| JP | 2002-352218 A | 12/2002 |
| JP | 2003-209886 | 7/2003 |
| JP | 2003-271617 | 9/2003 |
| JP | 2004-118573 | 4/2004 |
| JP | 2005-62929 A | 3/2005 |
| JP | 2005-107867 | 4/2005 |

* cited by examiner

FIG.3

MAP DIVISION DATA TABLE

| |
|---|
| LONGITUDINAL ANGLE OF ONE DIVISIONAL AREA=1° |
| LATITUDINAL ANGLE OF ONE DIVISIONAL AREA=40′ (2/3°) |
| NUMBER OF DIVIIONAL AREAS ALONG LINES OF LATITUDE=19 |
| NUMBER OF DIVISIONAL AREAS ALONG MERIDIANS=24 |
| LATITUDE OF START POINT OF MAP=30° N |
| LONGITUDE OF START POINT OF MAP=128° E |

FIG.4

DIVISIONAL AREA INDEX TABLE

| A(0, 23) | A(1, 23) | A(2, 23) | ····· | A(18, 23) |
|---|---|---|---|---|
| ⋮ | ⋮ | ⋮ | ····· | ⋮ |
| A(0, 2) | A(1, 2) | A(2, 2) | ····· | A(18, 2) |
| A(0, 1) | A(1, 1) | A(2, 1) | ····· | A(18, 1) |
| A(0, 0) | A(1, 0) | A(2, 0) | ····· | A(18, 0) |

FIG.5

LANDMARK DATA TABLE

| AREA | ID NUMBER | LM NAME | LM AREA COORDINATES | EXTENSION WIDTH |
|---|---|---|---|---|
| ... | ... | ... | ... | ... |
| (11, 8) | 100 | THEME PARK α | (αx1, αy1)...(αx5, αy5) | 5m |
| | 101 | FERRIS WHEEL β | (βx1, βy1)...(βx4, βy4) | 3m |
| | 102 | ROLLER COASTER γ | (γx1, γy1)...(γx6, γy6) | 3m |
| ... | ... | ... | ... | ... |
| ... | ... | ... | ... | ... |

| RECTANGULAR AREA COORDINATES | PARENT | AFFILIATE |
|---|---|---|
| ... | ... | ... |
| (Rαx1, Rαy1)...(Rαx4, Rαy4) | | 101, 102 |
| (Rβx1, Rβy1)...(Rβx4, Rβy4) | 100 | — |
| (Rγx1, Rγy1)...(Rγx4, Rγy4) | 100 | — |
| ... | ... | ... |
| ... | ... | ... |

LANDMARK SEARCH SYSTEM FOR DIGITAL CAMERA, MAP DATA, AND METHOD OF SORTING IMAGE DATA

FIELD OF THE INVENTION

The present invention relates to a landmark search system for searching for a landmark that is contained an image captured by a digital camera, and map data for the landmark search system. The present invention relates also to a digital camera, and a method and apparatus for sorting image data captured by the digital camera.

BACKGROUND OF THE INVENTION

In the field of digital cameras, it is getting popular to get position data, data of latitude and longitude, of a camera location from the GPS (Global Positioning System), and memorize the position data in association with captured image data. An exemplar of such a digital camera is a camera phone with a GPS receiver. Also, a device for deducing the name of an imaged place or landmark from the attached position data has been suggested.

For example, Japanese Laid-open Patent Application No. 2003-209886 discloses a mobile terminal, a position information providing system and an imaging system, wherein a data base is provided for storing position information such as, latitudes and longitudes of places and landmarks, place-names and landmark names, data types, polygonal areas of named places and landmarks outlined by polylines, and letters for displaying the place-names and the landmark names. Based on the latitude and longitude of a location of a digital camera, position information of the camera location is retrieved from the data base, and a landmark name of the camera location is determined based on the retrieved information.

Japanese Laid-open Patent Application No. 2001-157098 discloses a camera device and a method for displaying camera position information, wherein a map is divided along longitudinal and latitudinal lines into a lot of areas, and a mesh number is allocated to each of the areas, so that landmarks located in the respective areas are stored in a memory in correspondence with the individual mesh numbers. Based on the latitude and longitude of a location of the camera device, the area in which the camera location exits is determined. Then, based on the mesh number of the determined area, a landmark name of the camera location is retrieved from the memory.

In the prior art disclosed in Japanese Laid-open Patent Application No. 2003-209886, however, it takes time for retrieval of the position information. This is because the retrieval of the position information from the data base is done based on the latitude and longitude of the camera location, while scanning even those landmarks as the object of searching, which are far distant from the camera location, e.g. those located in Hokkaido while the camera location is in Tokyo. According to the prior art disclosed in Japanese Laid-open Patent Application No. 2001-157098, all areas are scanned as the object of searching for the area where the camera location exits. Therefore, it takes certainly long time for the data retrieval.

Meanwhile, most of digital cameras stores captured image data in a storage medium, e.g. a memory card, so that captured images may be displayed on an LCD or the like based on the stored image data. Thus, the user of the digital camera can observe the captured image without the need for printing the image. Indeed image data is superior to photo-prints in view of preservation properties, but, with regard to efficiency of sorting and searching the images, the image data is inferior to the photo-prints, because the photo-prints may be put in order by filing them into albums or the like.

To improve the efficiency of sorting the image data, Japanese Laid-open Patent Application No. 2005-107867 suggests an apparatus for and a method of making an album, wherein position data obtained from a GPS satellite is attached to image data, and geometrical ranges of respective camera locations of the stored image data are derived from the respective image data, so that the image data of many images are sorted according to the ranges of the camera locations.

According to an image sorting method disclosed in Japanese Laid-open Patent Application No. 2003-271617, GPS data, i.e. position data obtained from a GPS satellite, are attached to each image file, and different folders are prepared for different GPS data, so that the image files are sorted according to the attached GPS data and stored in the corresponding folders.

However, if position data obtained from the GPS satellite is inaccurate because of a low GPS function, and thus a wrong place-name or landmark is selected, the image data will be sorted wrongly. In the prior arts, it is impossible to change the results of sorting afterward.

SUMMARY OF THE INVENTION

In view of the foregoing, a primary object of the present invention is to provide a place search system that can quickly search out a landmark located in a camera location.

Another object of the present invention is to provide a search method and map data for the landmark search system.

Still another object of the present invention is to provide a method and apparatus for sorting image data captured by a digital camera, as well as a digital camera having an image sorting function, whereby the result of sorting may be changed afterward.

To achieve the above object, a landmark search system of the present invention comprises a digital camera comprising a position data obtaining device for obtaining position data of a camera position at which an image is captured, and a data storage device for storing the position data in association with image data of the captured image; a map data storage device storing map data, the map data comprising area data of divisional areas which are provided by dividing a map area at regular intervals of latitude and longitude, and place data prepared for each of the divisional areas, the place data including data of landmarks located in each of the divisional areas; and a search device that searches the map data based on the position data, to select one divisional area that includes the camera position, and thereafter retrieve the place data for the selected divisional area, to determine a landmark that corresponds to the camera position.

According to the present invention, a search method for retrieving data of a landmark that corresponds to a camera position at which an image is captured by a digital camera, comprises steps of preparing map data that comprises area data of divisional areas which are provided by dividing a map area at regular intervals of latitude and longitude, and place data prepared for each of the divisional areas, the place data including data of landmarks located in each of the divisional areas; obtaining position data of the camera position; searching the map data based on the position data, to select one divisional area that includes the camera position; and thereafter retrieving the place data for the selected divisional area, to determine the landmark that corresponds to the camera position.

Preferably, the place data comprises landmark name data and landmark area data, and the landmark area data comprises data of latitudes and longitudes of vertexes of polygonal areas that outline actual areas of the respective landmarks.

Preferably, the landmark area data further comprises data of an extended area that is extended in all directions by a predetermined width from each of the polygonal areas.

Preferably, the place data further comprises data of inclusive relation between those landmarks, of which one is included in the area of another.

An image sorting apparatus of the present invention comprises an image data storage device storing data of an image with position data that indicates a camera position at which the image is captured; a search device for searching map data based on the position data, to retrieve place data of a landmark that corresponds to the camera position, the place data including landmark name data and landmark area data; an image data sorting device for sorting the image data according to the place data; a display device for displaying results of sorting by the image data sorting device; and a revising device for revising the place data after the place data is memorized in association with the image data, in order to sort the image data differently.

According to a preferred embodiment, the revising device comprises an operating device, and the display device displays a list of landmark names under which respective image data are sorted, and when a landmark name is selected from the list through the operating device, the display device displays a list of those image data which are sorted under the selected landmark name. When one of the displayed image data is selected through the operating device, an enlarged image of the selected image data, the landmark name under which the selected image data is sorted, and a list of neighboring landmarks to the camera position of the selected image data are displayed, and wherein when one of the neighboring landmarks is selected through the operating device, the place data of the selected image data is revised to sort the selected image data under the name of the selected neighboring landmark.

It is preferably to display the list of landmark names in a tree structure that shows relation of inclusion between those landmarks, of which one is located in the area of another.

The map data may be stored in a storage device or a removable storage medium. It is also possible to retrieve the map data from an external data server storing the map data.

An image sorting method of the present invention comprises steps of obtaining position data that indicates a camera position at which data of an image is captured; searching map data based on the position data, to retrieve place data of a landmark that corresponds to the camera position, the place data including the name of the landmark; associating the place data with the image data; sorting the image data according to the place data; and revising the place data after the place data is associated with the image data, to sort the image data differently.

It is possible to incorporate the image sorting apparatus of the present invention into a digital camera.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 3 is an explanatory diagram of a map division data table;

FIG. 4 is an explanatory diagram of a divisional area index table;

FIG. 5 is an explanatory diagram of a landmark data table;

DESCRIPTION OF THE PREFERRED EMBODIMENTS

Figure 1:
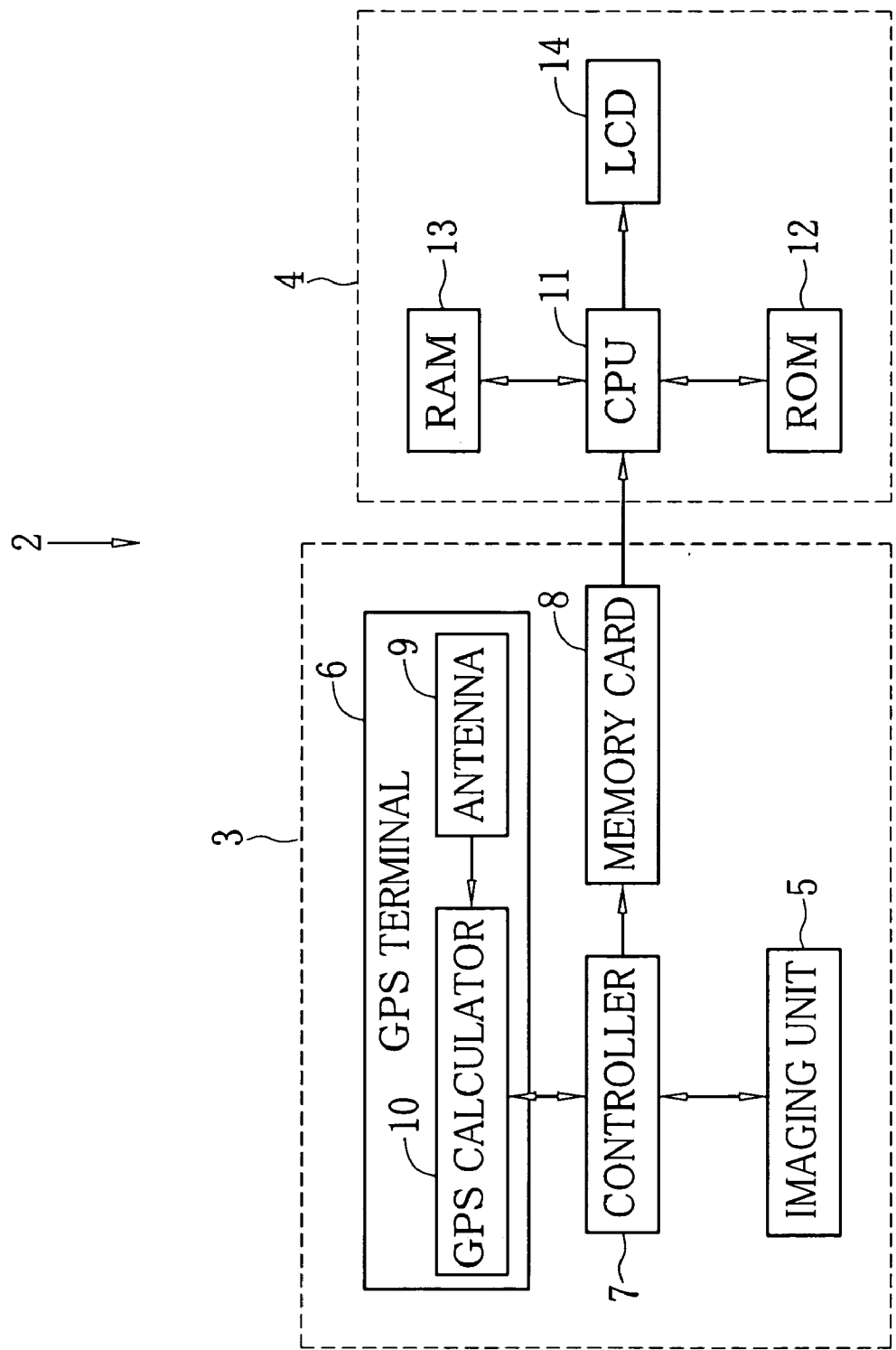
FIG. 1 is a block diagram illustrating a camera location landmark search system, according to an embodiment of the present invention.

As shown in FIG.1, a camera location landmark search system 2, an embodiment of the search system of the present invention, is comprised of a digital camera 3 and a personal computer 4.

The digital camera 3 is provided with an imaging unit 5 that comprises a shutter button and a taking lens in a conventional manner, a GPS terminal 6 for locating a present camera position and getting position data of the present camera position, and a controller 7. A memory card 8 for storing captured image data is detachably attached to the digital camera 3. The GPS terminal 6 has an antenna 9 and a GPS calculator 10. The antenna 9 is for receiving electric waves from a GPS satellite that is going around the earth. The received electric wave is sent to the GPS calculator 10, which stores a calculation program for calculating based on the electric wave position data of the present camera position, i.e. latitude and longitude of the present camera position.

When an image is captured by operating the imaging unit 5, the controller 7 outputs a program activation signal to the GPS calculator 10, so the GPS calculator 10 activates the calculation program to calculate position data i.e. latitude and longitude of the present camera position on the basis of the electric wave. Then the GPS calculator 10 sends the position data to the controller 7, so the controller 7 associates image data of the captured image with the position data from the GPS calculator 10, and writes them on the memory card 8. It is alternatively possible to provide the image data with a position data storage segment, and write the position data in the position data storage segment of the image data.

Figure 2:
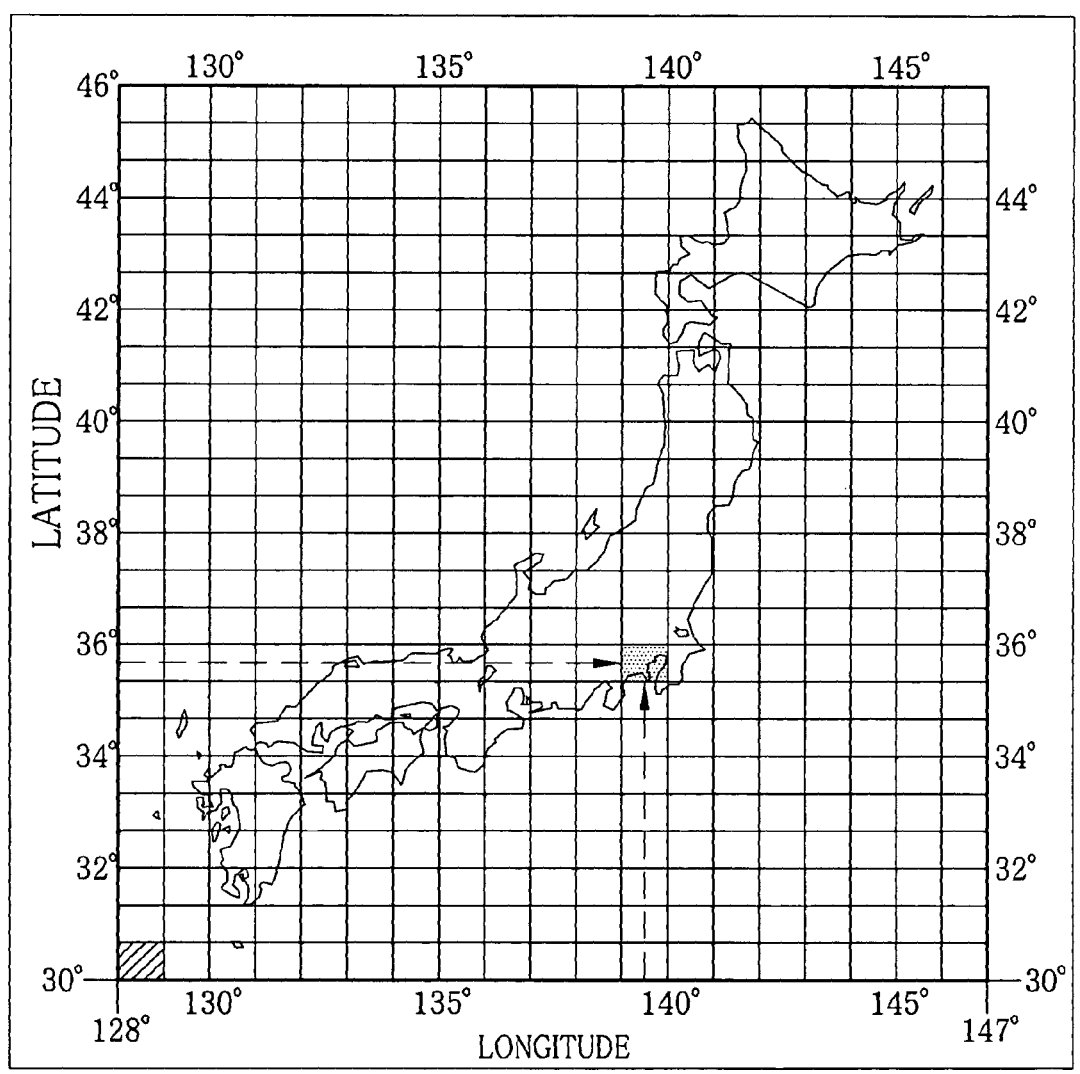
FIG. 2 is an explanatory diagram of map data.

The personal computer 4 is provided with a CPU 11 that functions as a place searching device, a ROM 12 as a map data storage device, a RAM 13 as a storage device for storing image data and position data in association with each other, and an LCD 14 as a display device. In the present embodiment, the ROM 12 stores data of a schematic 2-D map of Japan. As shown in FIG.2, the map expressed by the map data stored in the ROM 12 covers a map area having a start point at latitude 30° N and longitude 128° E, and an end point at latitude 46° N and longitude 147° E. The map data is divided at 1° interval of longitude and 40'(⅔°) interval of latitude. In other words, the map area is divided into 456 (=19×24) divisional areas in the present embodiment.

The map data is constituted of map division data table shown in FIG.3 and divisional area index table shown in FIG.4. The map division data table stores longitudinal and latitudinal angles of one divisional area, the number of divisional areas along lines of latitude, i.e. on the same latitudinal position, and the number of divisional areas along meridians (lines of longitude), i.e. on the same longitudinal position. The map division data table also stores latitude and longitude of the start point of the map. In the present embodiment, the longitudinal and latitudinal angles of one divisional area are 1° and ⅔°, respectively. The number of divisional areas along lines of latitude is 19, and the number of divisional areas along meridians is 24. The latitude and longitude of the start point of the map are 30° and 128°, respectively.

The divisional area index table shown in FIG.4 includes data of latitudes and longitudes of respective start points of all divisional areas. In FIG.4, a couple of parenthetic numbers designate the place of each individual area relative to a start area A(0,0) that is located at the start point of the map, the area hatched in FIG.2. That is, the left parenthetic number of each area designates the number of order counted from the start area along latitude lines, whereas the right parenthetic number designates the number of order counted from the start area along meridians. For example, A(18,23) designates the area including the end point of the map area, and A(10,15) designates the area placed tenth from the start area in the direction of latitude lines and fifteenth from the start area in the direction of meridians.

Although the present embodiment describes the map data as divided at 1° interval of longitude and at 40'(⅔°) interval of latitude into 456 divisional areas, for convenience sake, the map data is to be divided more finely. In practice, the divisional areas of the map preferably have a length of 10 km or so along latitude lines and along longitude lines as well. Correspondingly to the smaller size of the divisional areas, the number of divisional areas along lines of latitudes and along meridians will increase.

As shown in FIG.5, the map data further include a landmark data table which stores place data, such as names of main landmarks, e.g. a theme park, a station and a school, which are located in the respective divisional areas, identification (ID) numbers assigned to the respective landmarks, area coordinates of the respective landmarks (LM area coordinates), extension widths, rectangular area coordinates, and parent data or affiliate data of the respective landmarks. Namely, the landmark data table stores data of place-names of the landmarks (LM name data) in LM name sections, and data of place areas and data of latitudes and longitudes of the respective places as landmark area coordinate data in LM area coordinate sections. In the present embodiment, an area A(11, 8) will be described as an example where there is a theme park α, and there are a Ferris wheel β and a roller coaster γ in the theme park α.

The theme park α has an ID number #100, whereas the Ferris wheel β and the roller coaster γ have ID numbers #101 and #102 respectively. Since the Ferris wheel β and the roller coaster γ are located in the theme park α, they can be regarded as affiliates or subsidiaries of the theme park α in the relation of inclusion among the landmarks. Accordingly, the ID numbers #101 and #102 of the Ferris wheel β and the roller coaster γ are memorized in the affiliated data section of the theme park α, while the ID number #100 of the theme park α is memorized in the parent data sections of the Ferris wheel β and the roller coaster γ.

Figure 6:
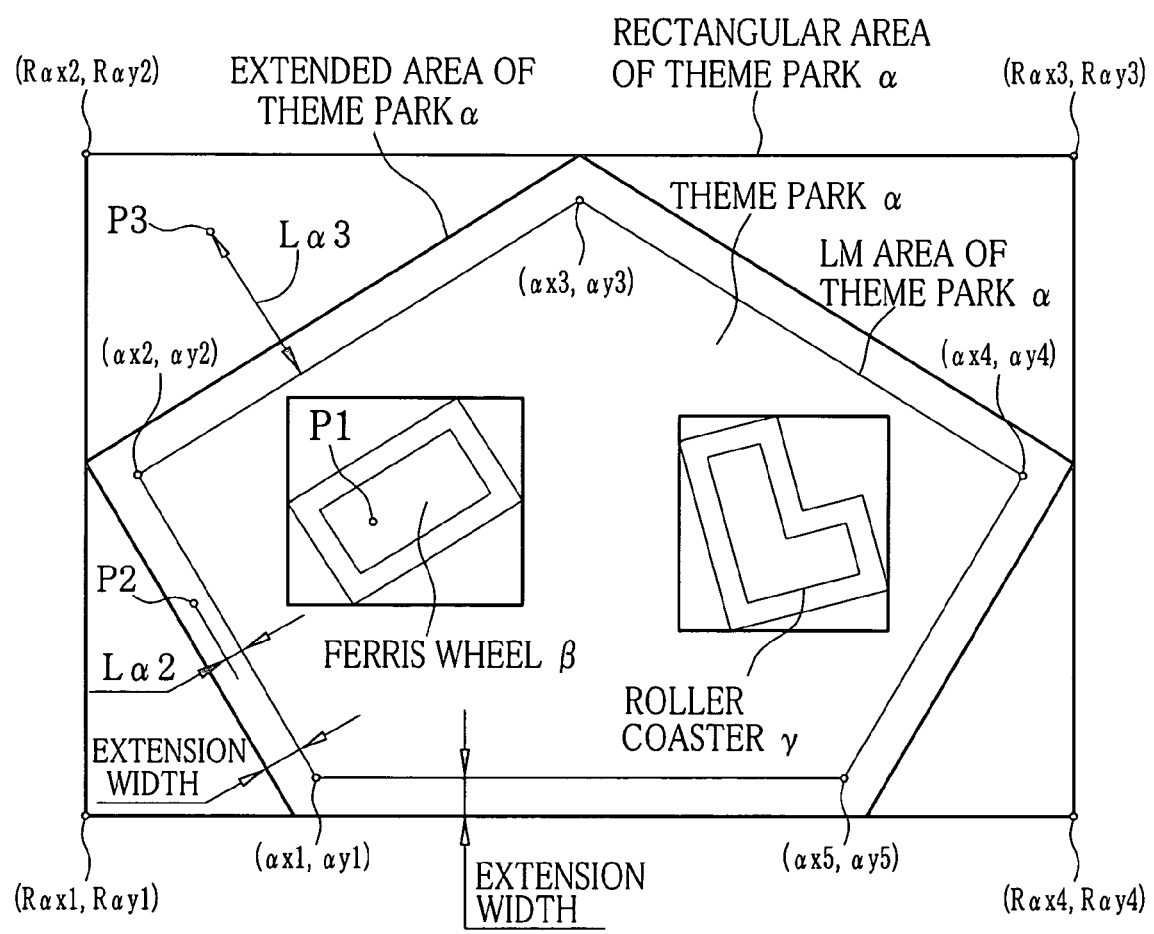
FIG. 6 is a plan view illustrating 2-D area data of a theme park.

FIG.6 shows area data of the theme park α schematically as a 2-D top plan view. The theme park α is a landmark having a pentagonal area, so data of coordinates (αx1, αy1), (αx2, αy2), (αx3, αy3), (αx4, αy4) and (αx5, αy5), which indicate respective latitudes and longitudes of the five vertexes, are memorized in the LM area coordinate section for the theme park α of the landmark data table. The area bounded by lines extending between these apexes may be called the landmark area of the theme park α. The area data further define an extended area of the theme park α, which is extended from the landmark area of the theme park α by a predetermined width in all directions. In the present example, the extension width from the landmark area to the extended area of the theme park α is 5 meters. Note that the extension width for each individual landmark is memorized in the extension width section of the landmark data table as shown in FIG.5. Furthermore, the landmark data table includes data of a rectangular area of each landmark, or called a minimum bounding rectangle of each landmark, which circumscribes the extended area of each landmark. Specifically, data of coordinates indicating latitudes and longitudes of four apexes of the rectangular area of the theme park α, i.e. (Rαx1, Rαy1), (Rαx2, Rαy2), (Rαx3, Rαy3) and (Rαx4, Rαy4) are memorized in the rectangular area coordinate section for the theme park α of the landmark data table.

Figure 7:
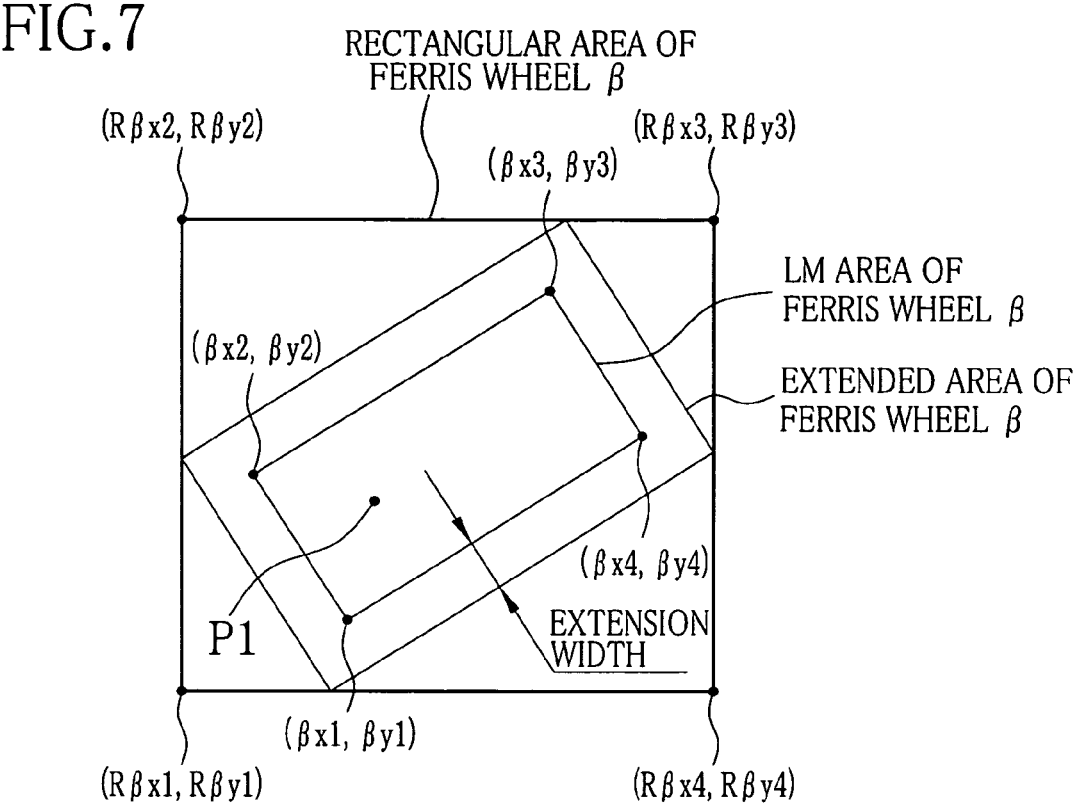
FIG. 7 is a plan view illustrating 2-D area data of a Ferris wheel.

FIG.7 shows area data of the Ferris wheel β schematically as a 2-D top plan view. The Ferris wheel β is a landmark having a rectangular area, so data of coordinates (βx1, βy1), (βx2, βy2), (βx3, βy3) and (βx4, βy4), which indicate respective latitudes and longitudes of the four apexes, are memorized in the LM area coordinate section for the Ferris wheel β of the landmark data table. The area bounded by lines extending between these apexes may be called the landmark area of the Ferris wheel β. The area data further define an extended area of the Ferris wheel β, which is extended by a predetermined width, e.g. 3 meters, in all directions from the landmark area of the Ferris wheel β. To define a rectangular area of the Ferris wheel β, which circumscribes latitudinal and longitudinal apexes of the extended area of the Ferris wheel β, data of coordinates indicating latitudes and longitudes of four apexes of the rectangular area of the Ferris wheel β, i.e. (Rβx1, Rβy1), (Rβx2, Rβy2), (Rβx3, Rβy3) and (Rβx4, Rβy4) are memorized in the rectangular area coordinate section for the Ferris wheel β of the landmark data table.

Figure 8:
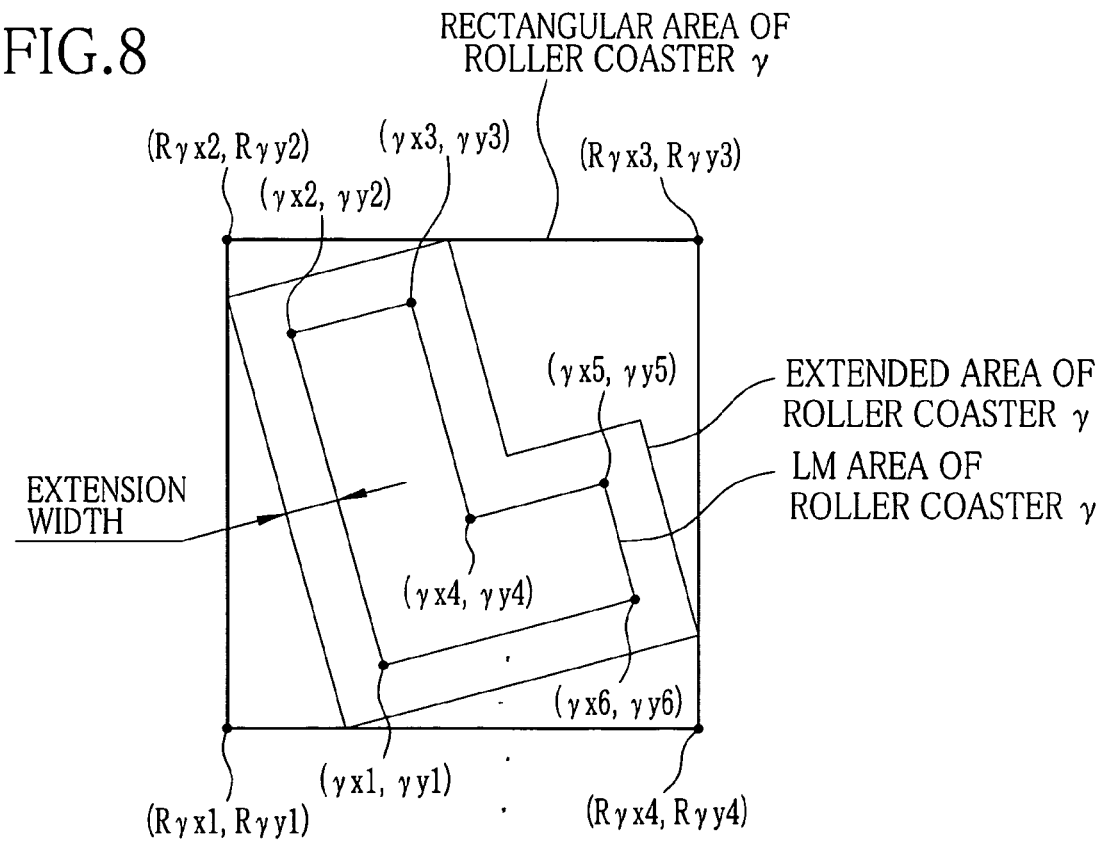
FIG. 8 is a plan view illustrating 2-D area data of a roller coaster.

FIG. 8 shows area data of the roller coaster γ schematically as a 2-D top plan view. The roller coaster γ is a landmark having a hexagonal area, so data of coordinates (γx1, γy1), (γx2, γy2), (γx3, γy3), (γx4, γy4), (γx5, γy5) and (γx6, γy6) which indicate respective latitudes and longitudes of the six apexes, are memorized in the LM area coordinate section for the roller coaster γ of the landmark data table. The area bounded by lines extending between the six apexes may be called the landmark area of the roller coaster γ. The area data further define an extended area of the roller coaster γ, which is extended by a predetermined width, e.g. 3 meters, in all directions from the landmark area of the roller coaster γ. To define a rectangular area of the roller coaster γ, which circumscribes latitudinal and longitudinal apexes of the extended area of the roller coaster γ, data of coordinates indicating latitudes and longitudes of four apexes of the rectangular area of the roller coaster γ, i.e. (Rγx1, Rγy1), (Rγx2, Rγy2), (Rγx3, Rγy3) and (Rγx4, Rγy4), are memorized in the rectangular area coordinate section for the roller coaster γ of the landmark data table.

Referring back to FIG. 1, when the memory card 8 is connected to the CPU 11 of the personal computer 4, image data and associated position data are read out from the memory card 8 and input in the CPU 11. For example, the input position data designates a camera position P1 that is located at latitude 35.7° and longitude 139.7°. Then, the CPU 11 retrieves data from the map data of the ROM 12, to determine one divisional area that includes the camera position P1. Note that the memory card 8 is connected to the CPU 11 by taking the memory card 8 out of the digital camera 3 and inserting the memory card 8 into a not-shown memory card slot of the personal computer 4.

Specifically, in order to determine the divisional area that includes the entry position P1, the latitude of the start point of the map (=30°) is reduced from the latitude of the camera position P1 (=35.7°), and the value obtained by the reduction (=5.7°) is divided by the latitudinal angle of one divisional area (=⅔°). Then, decimal part of the quotient (=8.55) is rounded off. The numerical value (=8) obtained in this way indicates the number of order of the divisional area including the camera position P1, as counted along meridians from the start area A(0, 0), the hatched area in FIG. 2. That is, the divisional area including the camera position P1 is determined to be one of the eighth areas from the start area A(0,0) in the direction of meridians.

Simultaneously, the longitude of the start point of the map (=128°) is reduced from the longitude of the camera position P1 (=139.7°), and the value obtained by the reduction (=11.7°) is divided by the longitudinal angle of one divisional area (=1°). Then, decimal part of the quotient (=11.7) is rounded off. The numerical value (=11) obtained in this way, indicates the number of order of the target divisional area as counted along lines of latitude from the start area A(0,0). Consequently, the target divisional area including the camera position P1 is determined to be the area A(11,8) that is placed eleventh in the direction of latitude lines, and eighth in the direction of meridians from the start area A(0,0). Thus, the target divisional area including the camera position is determined by calculation based on the input position data, i.e. latitude and longitude of the camera position. This method saves time for searching the target divisional area including the camera position, in comparison with a case where the input position data are compared with all divisional areas of the map data on searching the target divisional area.

After the target divisional area is determined, the CPU 11 searches for a landmark relating to the camera position P1 with reference to the landmark data table. Since the camera position P1 is determined to be included in the divisional area A(11,8), the CPU 11 searches for merely those landmarks which are located in the area A(11,8). In the present example, the camera position P1 is assumed to be located at the Ferris wheel β in the theme park α, as shown in FIG. 6.

First, the CPU 11 retrieves at least a rectangular area that includes the camera position P1 among the rectangular areas of the landmarks located in the determined divisional area A(11,8). So the rectangular area of the theme park α, and the rectangular area of the Ferris wheel β are retrieved in this example.

Next, the CPU 11 calculates a distance Lα1 from the camera position P1 to the LM area of the theme park α, and a distance Lβ1 from the camera position P1 to the LM area of the Ferris wheel β. Concretely, the CPU 11 first judges whether a camera position P is inside or outside a LM area of a landmark, using a known method of judging whether a point is inside or outside a polygon. If the camera position P is inside the LM area, the distance L from the camera position P to the LM area is held to be zero. If not, the shortest distance from the camera position P to the LM area is decided to be the distance L. Since the camera position P1 is located at the Ferris wheel β in the theme park α, both the distance Lα1 from the camera position P1 to the LM area of the theme park α and the distance Lβ1 from the camera position P1 to the LM area of the Ferris wheel β are decided to be zero.

When it is determined that there are more than one landmark, of which the distance L from the camera position P to the LM area is zero, the CPU 11 checks the parent data sections and the affiliate data sections of these landmarks, i.e. the theme park a and the Ferris wheel β in this example, to determine the relation of inclusion between these landmarks. Then, among these landmarks, one landmark whose ID number is memorized in the parent data section of the other landmark, i.e. the theme park α in this example, is deleted from the candidates. Thus, the Ferris wheel β is selected as the landmark for the camera position P1 (latitude 35.7° and longitude 139.7°).

Next, the CPU 11 outputs the LM name data of the finally selected landmark to the LCD 14, to display the name of the finally selected landmark, i.e. "Ferris wheel β" in this example, as the camera location of the captured image. Simultaneously, the CPU 11 associates the LM name data of the finally selected landmark with the image data, with which the position data is already associated, and writes them in the RAM 13.

If the input position data represents such a camera position that the distance from the camera position to any LM area of any landmark is not zero, the CPU 11 determines that the camera position is outside any LM areas of the determined divisional area. For example, if the input position data represent a camera position P2 that is located outside the theme park α but in the extended area of the theme park α, as shown in FIG. 6, the CPU 11 selects the theme park α as a landmark whose rectangular area includes the camera position P2. Next, the CPU 11 calculates a distance Lα2, that is the shortest distance from the camera position P2 to the LM area of the theme park α. Thereafter, the CPU 11 compares the distance Lα2 with the extension width for the theme park α, which is memorized in the extension width section for the theme park α of the landmark data table. If the distance Lα2 is not more than the extension width of the theme park α, the CPU 11 determines the theme park α to be the finally selected landmark, and outputs the LM name data of the theme park α to the LCD 14, to display "theme park α" as the camera location. Simultaneously, the CPU 11 associates the LM name data of the finally selected landmark, i.e. the theme park α in this example, with the image data, and writes them in the RAM 13.

Alternatively, in the case where the distance Lα2 is more than zero but within the extension width of the nearest landmark, i.e. the theme park α in this example, the CPU 11 may output the LM name data of those landmarks to the LCD 14, which are located in the vicinity of the camera position P2, to display the landmark names as the camera location, sequentially in the order from the nearest, i.e. "theme park α", "Ferris wheel β" and "roller coaster γ". In that case, the CPU 11 associates the LM name data of these landmarks with the image data, and writes them in the RAM 13.

If the input position data represent a camera position P3 that is located outside the extended area of the theme park α but in the rectangular area of the theme park α, as shown in FIG. 6, the CPU 11 selects the theme park α as a landmark whose rectangular area includes the camera position P3. Next, the CPU 11 calculates a distance Lα3, that is the shortest distance from the camera position P3 to the LM area of the theme park α. Thereafter, the CPU 11 compares the distance Lα3 with the extension width for the theme park α. Because the distance Lα3 is more than the extension width of the theme park α, the CPU 11 does not determine the theme park α to be the finally selected landmark. That is, the camera position P3 is judged to be outside any landmark. In that case, the CPU 11 outputs data of a message that the camera location of this image is outside the main landmarks, to the LCD 14, to let the LCD 14 display this message. Simultaneously, the CPU 11 associates the data of this message with the image data, and writes them in the RAM 13.

If there are more than one landmarks whose rectangular areas include the camera position P, only the distance L from the camera position P to the nearest landmark is compared with the extension width of the nearest landmark.

Figure 9:
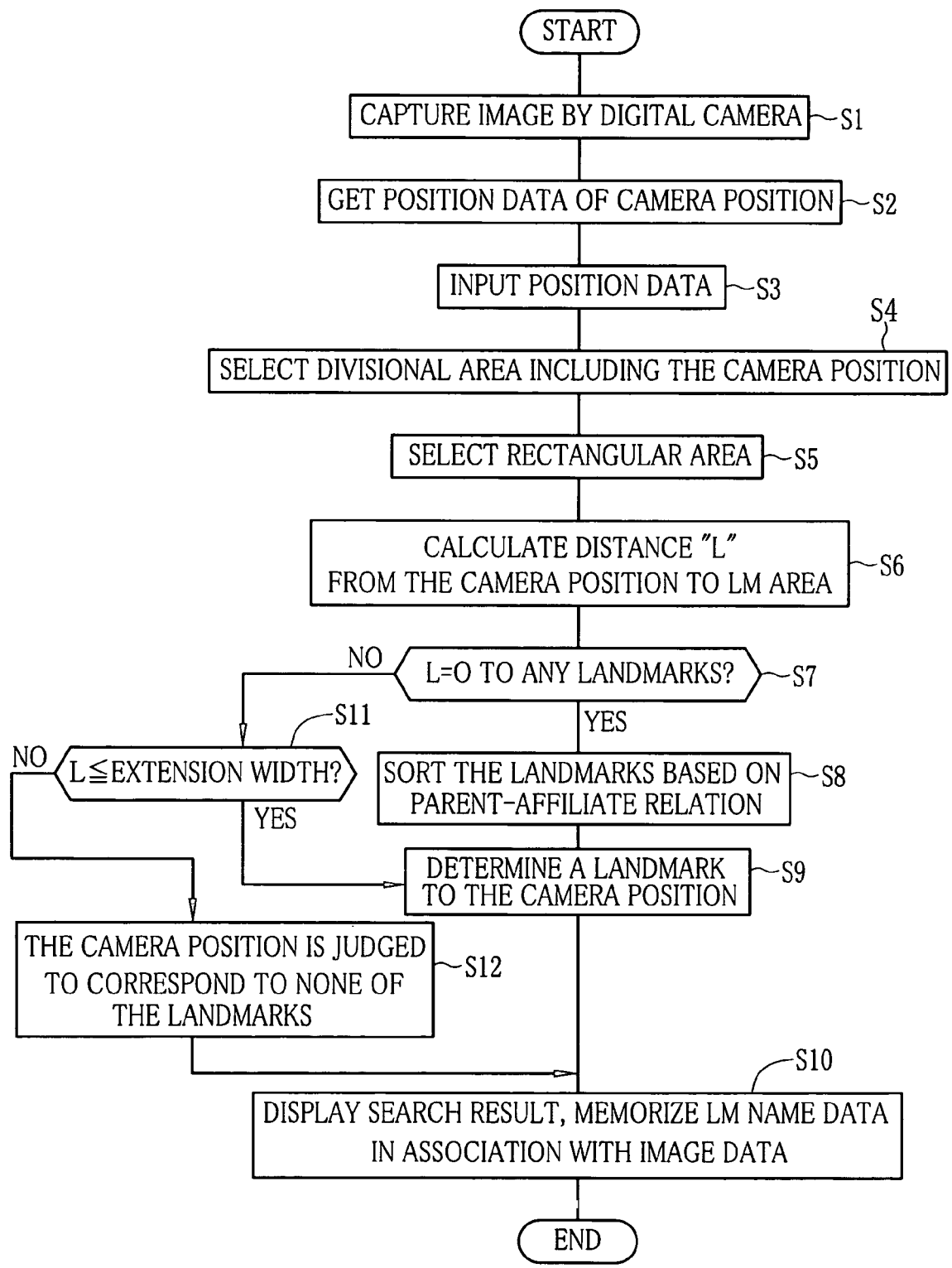
FIG. 9 is a flow chart illustrating a sequence of operation of the camera location landmark search system.

Now the operation of the camera location landmark search system 2 will be described with reference to the flow chart of FIG. 9. When an image is captured by the digital camera 3 (S1: step 1), the program activation signal is fed from the controller 7 to the GPS calculator 10, so the GPS calculator 10 activates the calculation program to calculate position data, i.e. latitude and longitude, of the present camera position based on the electric wave received on the antenna 9 (S2: step 2). The calculated position data is sent to the controller 7, so the controller 7 memorizes image data of the captured image in association with the position data from the CPS calculator 10 on the memory card 8.

When the memory card 8 is connected to the CPU 11, the image data and the associated position data are read out from the memory card 8 and fed to the CPU 11 (S3: step 3). Then, the CPU 11 retrieves data from the map data of the ROM 12, to select one divisional area that includes a camera position designated by the input position data (S4: step 4) among all divisional areas of the map data stored in the ROM 12. For example, if the input position data designates the camera position P1, that is located at latitude 35.7° and longitude 139.7°, the divisional area A(11,8) is selected.

Next, the CPU 11 retrieves data of landmarks located in the selected divisional area from landmark data table, to select at least a rectangular area that include the camera position (S5: step 5). As for the camera position P1, the rectangular areas of the theme park α and the Ferris wheel β are selected as the search results.

Next, the CPU 11 calculates a distance L from the camera position to each LM area included in the selected rectangular area (S6: step 6). For example, the distance Lα1 from the camera position P1 to the LM area of the theme park α, and the distance Lβ1 from the camera position P1 to the LM area of the Ferris wheel β.

Thereafter, the CPU 11 judges whether there is any landmark, to which the distance L is zero (S7: step 7). When it is determined that there are more than one landmark, of which the distance L from the camera position P to the LM area is zero, the CPU 11 checks the parent data sections and the affiliate data sections of these landmarks, i.e. the theme park α and the Ferris wheel β for the camera position P1, to determine the relation of inclusion between these landmarks. Then, among these landmarks, one landmark whose ID number is memorized in the parent data section of the other landmark, i.e. the theme park α in this example, is deleted from the candidates (S8: step 8). Thus, the Ferris wheel β is finally selected as the landmark for the camera position P1 (S9: step 9).

Next, the CPU 11 outputs the LM name data of the finally selected landmark to the LCD 14, to display the name of the finally selected landmark, and memorizes the LM name data of the finally selected landmark in association with the image data and its position data in the RAM 13 (S10: step 10).

If, on the other hand, it is judged that the distance L from the camera position to any LM area of any landmark is not zero (S7), the CPU 11 selects a landmark whose rectangular area includes the camera position, e.g. the theme park α for the camera position P2.

Next, the CPU 11 compares the distance L with the extension width for the selected landmark, e.g. the distance Lα2 from the camera position P2 to the LM area of the theme park α with the extension width for the theme park α (S11: step 11). If the distance L is not more than the extension width of the selected landmark, the CPU 11 determines the selected landmark to be the finally selected landmark. Thus, the theme park α is finally selected as the landmark for the camera position P2 (S9).

Then, the CPU 11 outputs the LM name data of the theme park α to the LCD 14, to display "theme park α" as the camera location. Simultaneously, the CPU 11 associates the LM name data of the theme park α with the image data, of which the position data designates the camera position P2, and writes them in the RAM 13 (S10).

If the distance L from the camera position to the nearest landmark area is determined to be more than the extension width for the nearest landmark (S11), like the case of the camera position P3, the CPU 11 judges that the camera position is not included in any of the main landmarks (S12: step 12). In that case, the CPU 11 outputs data of a message that the camera location of this image is outside the main landmarks, to the LCD 14, to let the LCD 14 display this message. Simultaneously, the CPU 11 associates the data of this message with the image data, and writes them in the RAM 13 (S10).

As described so far, the divisional area that includes the camera position of the captured image is retrieved by calculation based on the input position data, latitude and longitude of the camera position, which is memorized in association with the image data of the captured image. Therefore, it takes shorter time for searching the divisional area that includes the camera position, in comparison with the case where the input position data are compared with all divisional areas of the map data.

Furthermore, the landmark data table includes data of the LM area coordinates, the extension widths and the rectangular area coordinates, so that a camera position may be determined to be included in a landmark even while the camera position exists in the extension area of that landmark. Accordingly, even while an error occurs because of insufficient accuracy of the map data or the GPS calculation, if the error is within the range of the extension width, the error is absorbed, so a proper landmark is retrievable. As for an image that is captured at a camera position outside a landmark but contains the landmark as the background, if the camera position is within the extension area of the landmark, the camera location landmark search system 2 selects the landmark as the camera location of the captured image.

Since the name of the finally selected landmark is displayed on the LCD 14, the user can instantly see the name of the landmark relating to the captured image. Since the image data is associated with the position data when it is written in the memory card 8, and is association with the LM name data of the finally selected landmark when it is written in the RAM 13, the user can see the camera location of the captured image just by reading out its image data from the RAM 13. When a plurality of landmarks are selected for one image, and data of their names are memorized in the RAM 13 in association with the image data, the user may select one among these landmarks afterward, and rewrite the image data in association with the LM name data of the selected one in the RAM 13.

Although the camera location landmark search system 2 of the above embodiment consists of the digital camera 3 and the personal computer 4, the search system of the present invention is not to be limited to the above embodiment. For example, it is possible to integrate all components of the system, including the CPU 11, the ROM 12, the RAM 13 and the LCD 14, into a digital camera.

Figure 10:
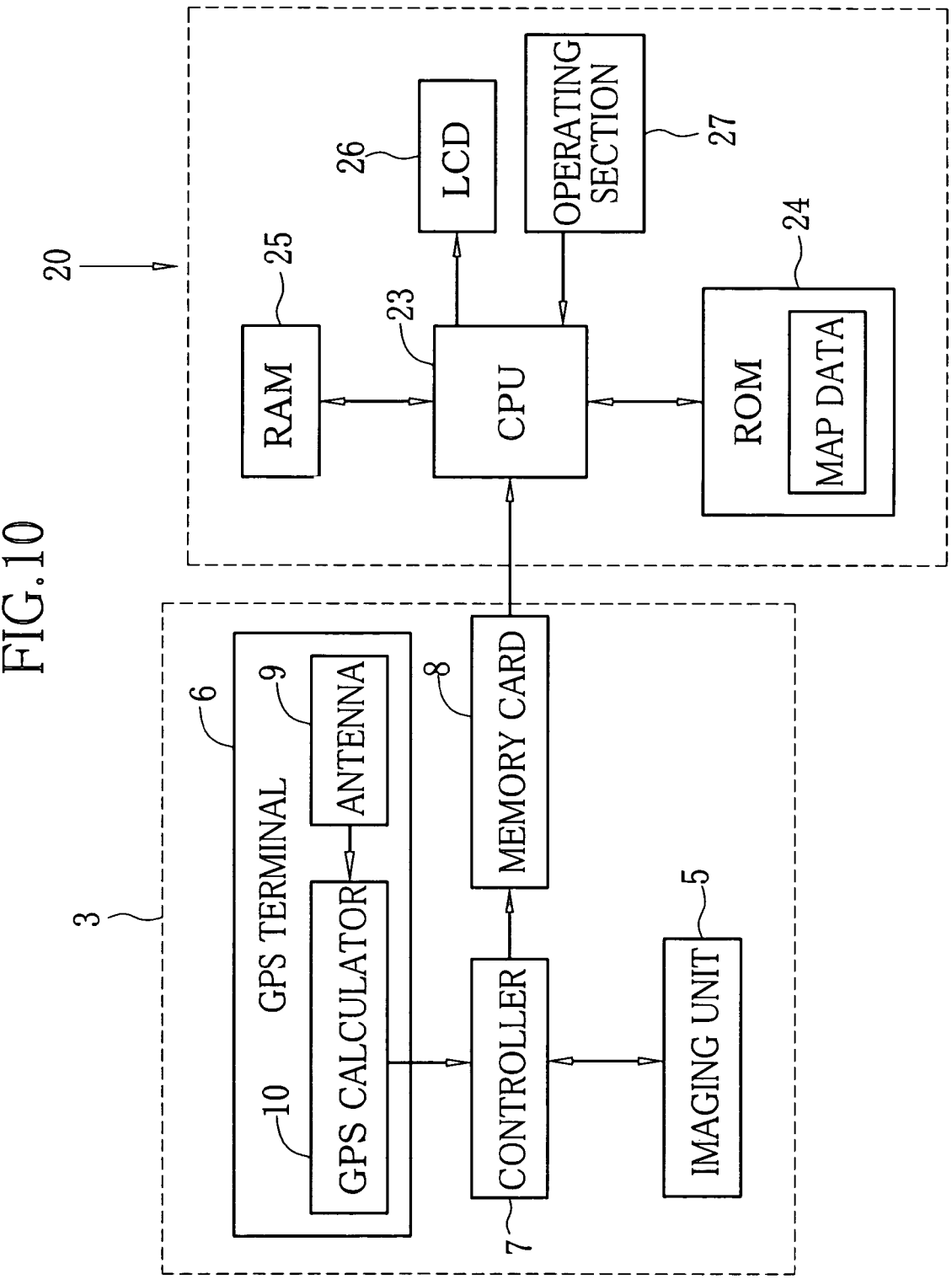
FIG. 10 is a block diagram illustrating a digital camera and an image sorting apparatus for sorting image data captured by the digital camera, according to another embodiment of the present invention.

FIG. 10 shows an image sorting apparatus 20 for use with a digital camera 3 according to another embodiment of the present invention. The digital camera 3 may have the same structure as described with reference to FIG. 1, so the following description of the digital camera 3 will relate merely to those features essential to the present embodiment.

The image sorting apparatus 20 is constituted of a personal computer comprising a CPU 23 as an image data sorting device, a ROM 24 as a map data storage device, a RAM 25 as an image data storage device, an LCD 26 and an operating section 27 as an input device. The operating section 27 includes a keyboard and a mouse, and is operated to input control data and command in the CPU 23.

The ROM 24 stores data of a schematic map of Japan, e.g. the map data as described above with reference to FIGS. 2 to 8. The ROM 24 also stores image data read out from a memory card 8 of the digital camera 3. The image data stored in the ROM 24 include LM name data that represent the names of landmarks located in those places where the image data are captured.

To transfer the image data from the memory card 8 to the ROM 24, the memory card 8 is taken out of the digital camera 3, and is inserted into a not-shown card slot of the image sorting apparatus 20. Then the CPU 23 reads the image data from the memory card 8 and memorizes them in the RAM 25. Thereafter, the CPU 23 searches the map data of the ROM 24 for a landmark based on position data, latitude and longitude of a camera position, which is written in the image data, in the same way as set forth above with respect to the camera location landmark search system 2. Thus, the CPU 23 functions as a device for searching a place or landmark based on the position data, like the CPU 11 of the first embodiment. The CPU 23 writes LM name data of the found landmark in the image data, and then memorizes the image data in the ROM 24. The LM name data may be stored in the ROM 24 in association with the image data, instead of writing the LM name data directly in the image data.

Figure 11:
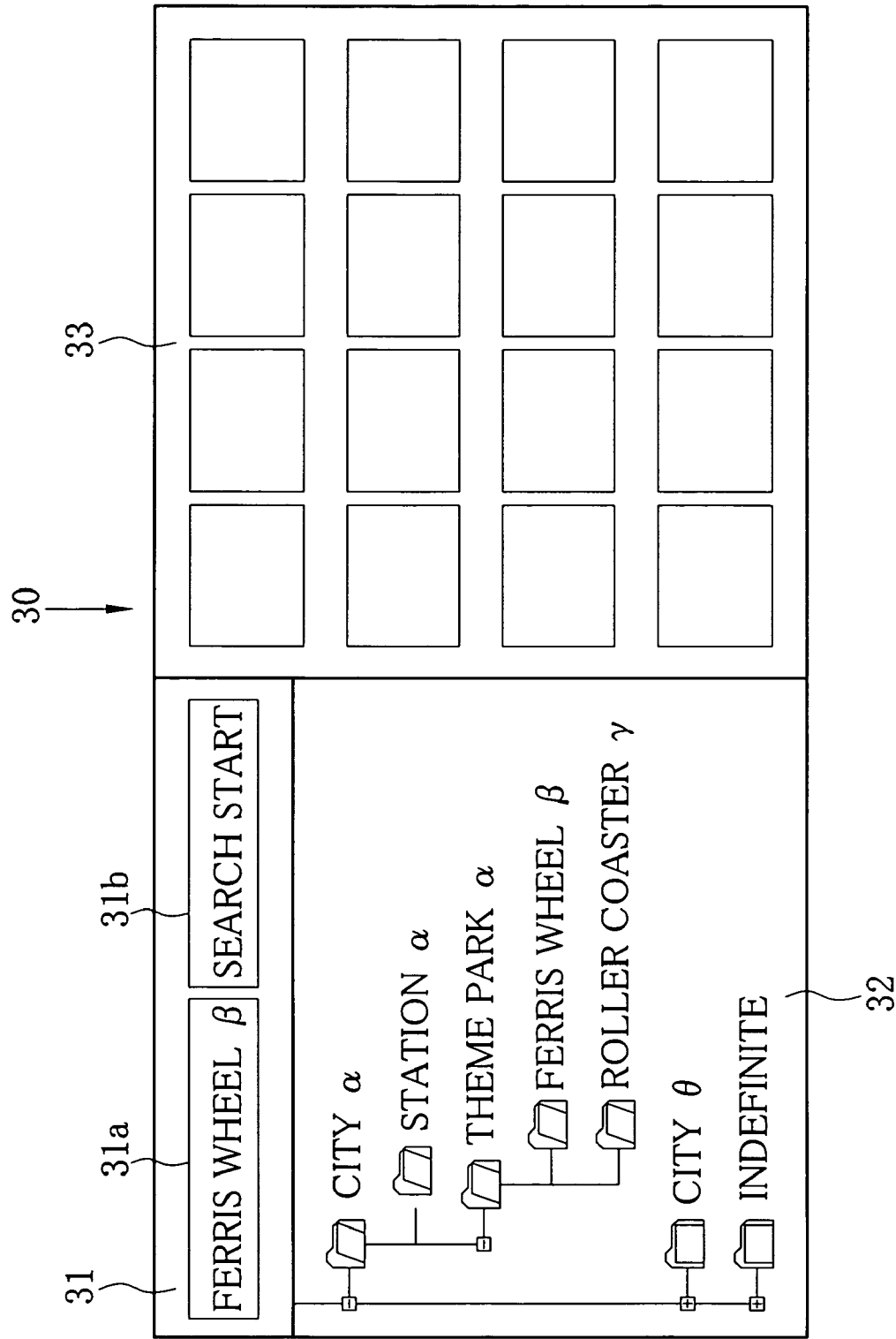
FIG. 11 is an explanatory diagram illustrating an image search screen of the image sorting apparatus.

The ROM 24 also stores an image search program. In response to a keyword for image-searching, e.g. "start image-searching", is entered through the operating section 27, the CPU 23 activates the image search program. When the image search program gets active, the LCD 6 is driven to display an image search screen 30 as shown in FIG. 11. The CPU 23 sorts the image data according to the LM name data, to display results of the sorting on the image search screen 30.

The image search screen 30 is provided with an image search section 31, a sort and select section 32 and an image index section 33. The image search section 31 is provided with a keyword entry box 31a for entering a keyword for searching, and a search start button 31b for starting searching for those image data which relate to the entered keyword.

The sort and select section 32 displays all the landmark names, which are written as the LM name data in the image data, as folder names in a tree structure. The image index section 33 displays thumbnails of those image data which are retrieved by operating the image search section 31, or those image data which are sorted and memorized in a folder as selected at the sort and select section 32. The present embodiment will be described on the assumption that the ROM 24 stores image data that are sorted and memorized in folders for those landmarks which are retrieved from the map data, e.g. city α, station α, theme park α, Ferris wheel β, roller coaster γ and city θ, and a folder for indefinite places. Thus, the LCD 26 functions as a device for displaying a list of folder names (landmark names) as folders of the sorted image data, and also as a device for displaying a list of images which are sorted in a selected folder.

The sort and select section 32 displays the tree structure of the folders for the respective landmarks: city α, station α, theme park α, Ferris wheel β, roller coaster γ and city θ, and the folder for unidentified places. The station α and the theme park α are landmarks which are located in the city α, so the folders for the station α and the theme park α are contained in the folder for the city α. The Ferris wheel β and the roller coaster γ are landmarks which are located in the theme park α, so the folders for the Ferris wheel β and the roller coaster γ are contained in the folder for the theme park α. Accordingly, the folder named city α, the folder named city θ and the folder named unidentified places are in the grade of the folder tree, and the folder named theme park α is a subfolder to the folder named city α, and the folder named Ferris wheel β and the folder named roller coaster γ are subfolders to the folder named theme park. In the following description, those landmarks which assigned to the folders of the same branch, e.g. the city α, the station α, the theme park α, the Ferris wheel β and the roller coaster γ, will be referred to as neighboring landmarks.

When the operating section 27 is operated to open the folder named city α, the folders named station α, theme park α, Ferris wheel β and roller coaster γ are displayed on the sort and select section 32, and simultaneously a list of all image data sorted into these folders, i.e. the folders named city α, station α, theme park α, Ferris wheel β and roller coaster γ are displayed as thumbnails on the image index section 33. When one of these folders, for example, the folder named Ferris wheel β is selected by operating the operating section 27, a list of those image data sorted into the folder named Ferris wheel β are displayed as thumbnails on the image index section 33.

Into the folder for indefinite places are sorted those image data, to which any related landmarks can not be found and thus it is impossible to sort them into any folders for definite landmarks.

The image search section 31 is for searching the ROM 24 for those image data which relate to at least a keyword that is entered in the keyword entry box 21a. For example, when "Ferris wheel β" is entered in the keyword entry box 21a, and the search start button 21b is operated, the CPU 23 searches the ROM 24 for those image data which relate to the Ferris wheel β, and lets a list of all the retrieved image data displayed as thumbnails on the image index section 33.

Figure 12:
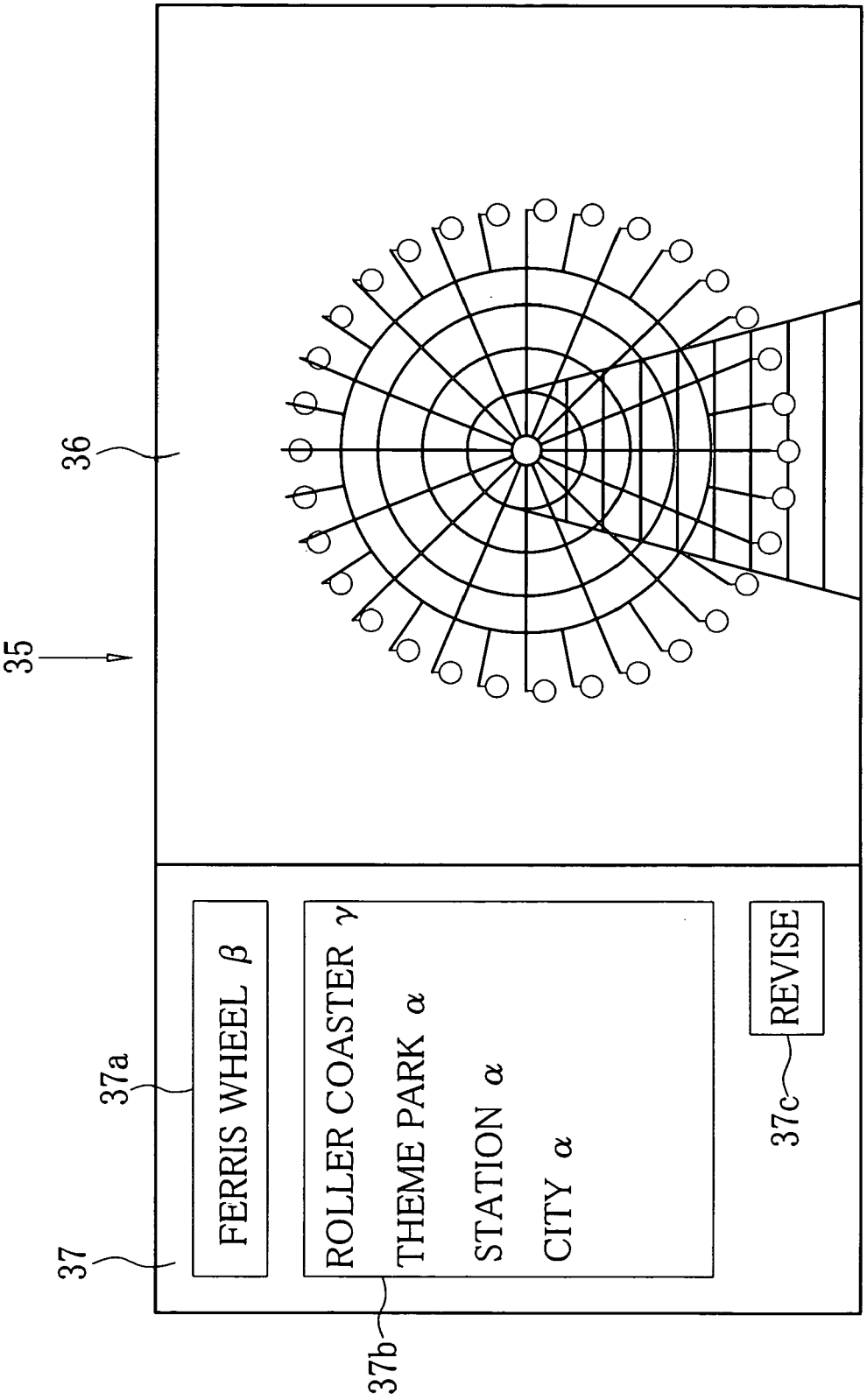
FIG. 12 is an explanatory diagram illustrating an image display screen of the image sorting apparatus.

When one of the thumbnails is chosen on the image index section 33 by operating the operating section 27, the LCD 6 switches to an image display screen 35 as shown, for example, in FIG.12. The image display screen 35 is provided with an image display section 36 and a landmark name revising section 37. The image display section 36 displays an enlarged image of the chosen thumbnail. It is possible to provide a size changing button on the image display section 36, for changing the size of the image displayed on the image display section 36.

The landmark name revising section 37 is provided with a landmark name display box 37a, a name choice section 37b and a landmark name revise button 37c. The landmark name display box 37a displays a landmark name that is designated by landmark name data memorized in the image data of the image presently displayed on the image display section 36. In the illustrated example, "Ferris wheel β" is displayed in the landmark name display box 37a. The name choice section 37b displays a list of the names of the neighboring landmarks sequentially from the nearest to the landmark whose name is displayed in the landmark name display box 37a. For example, as shown in FIG.12, when "Ferris wheel β" is displayed in the landmark name display box 37a, "roller coaster γ", "theme park α", "station α" and "city α" are displayed in this order from the top on the name choice section 37b.

As described so far, the CPU 23 also functions as a device for sorting image data according to the associated LM name data and a device for searching image data relating to the keyword. Also the LCD 26 functions as a device for displaying an enlarged image of selected image data, a device for displaying the name of the folder or landmark the enlarged image is sorted into, and a device for displaying a list of the names of neighboring landmarks of the landmark the enlarged image is sorted into.

When an image is captured by the digital camera 3, a controller 7 outputs a program activation signal to a GPS calculator 10, so the GPS calculator 10 activates a calculation program to calculate position data indicating the present camera position based on an electric wave received on an antenna 9. The calculated position data is fed to the controller 7. Since the calculation based on the electric wave from a GPS satellite is not accurate enough, the position data calculated by the GPS calculator 10 can sometimes indicate a position that deviates from the correct camera location. Furthermore, if, for example, an image of the roller coaster γ is captured by a photographer sitting in the Ferris wheel β, the calculated position data indicate a position inside the area of the Ferris wheel β, while the captured image contains the roller coaster γ. In that case, the LM name data written in the image data of the capture image represents the Ferris wheel β. When this image is chosen to be displayed on the image display section 36, "Ferris wheel β" is displayed in the landmark name display box 37a, while the enlarged image displayed on the image display section 36 contains the roller coaster γ. If the landmark name displayed in the landmark name display box 37a does not coincide with the image displayed on the image display section 36, it is necessary to correct the landmark name.

In order to correct the landmark name, the operating section 27 is operated to choose a proper one from the landmark names displayed in the name choice section 37b. For example, when "roller coaster γ" is chosen in the name choice section 37b, "roller coaster γ" is displayed in the landmark name display box 37a. By operating the landmark name revise button 37c in this condition, the CPU 23 rewrites the LM name data of the roller coaster γ in place of the LM name data of the Ferris wheel β that has been written in the image data of the image displayed on the image display section 36. Thereafter, the CPU 23 rewrites the image data on the ROM 24. In this way, the LM name data is corrected to coincide with the image. Therefore, the CPU 23 further functions as a device for changing the LM name data, i.e. camera location data, of the image data, and thus changing the folder of the image data, that is sorted according to the camera location.

Now the operation of the image sorting apparatus 20 will be described with reference to the flow charts shown in FIGS. 13 to 16.

Figure 13:
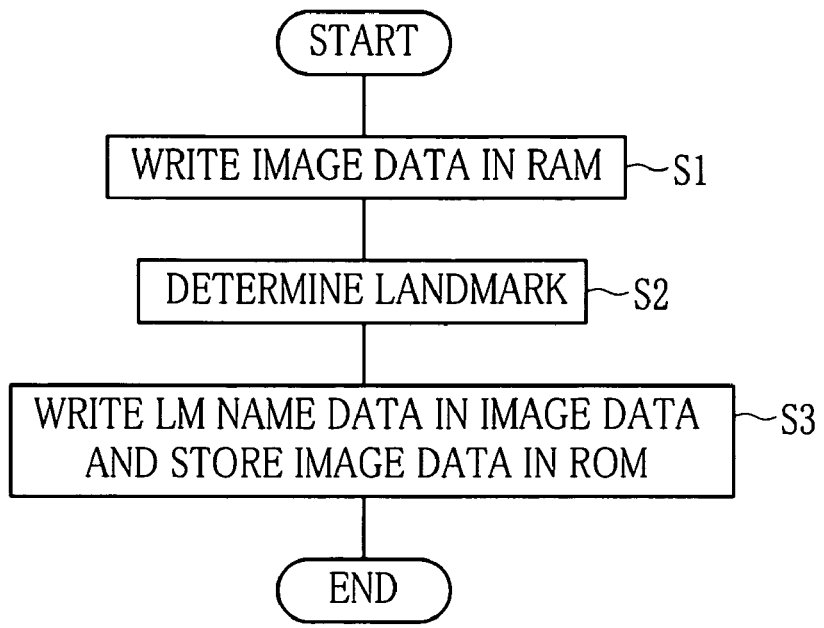
FIG. 13 is a flow chart illustrating a sequence of searching a landmark of the camera location based on the position data written in the image data.

FIG. 13 shows a sequence of searching a landmark of the camera location based on the position data written in the image data. When the memory card 8 is connected to the CPU 23, the CPU 23 reads the imaged data from the memory card 8, and writes the read image data in the RAM 25 (S1). Next, the CPU 23 searches the ROM 24 based on the position data as written in the image data, to selects a landmark (S2). For example, when the position data represents the camera position P1, the Ferris wheel β is selected as the landmark for the camera position P1. Then the CPU 23 writes the LM name data of the selected landmark in the image data, and memorizes the image data in the ROM 24 (S3).

Figure 14:
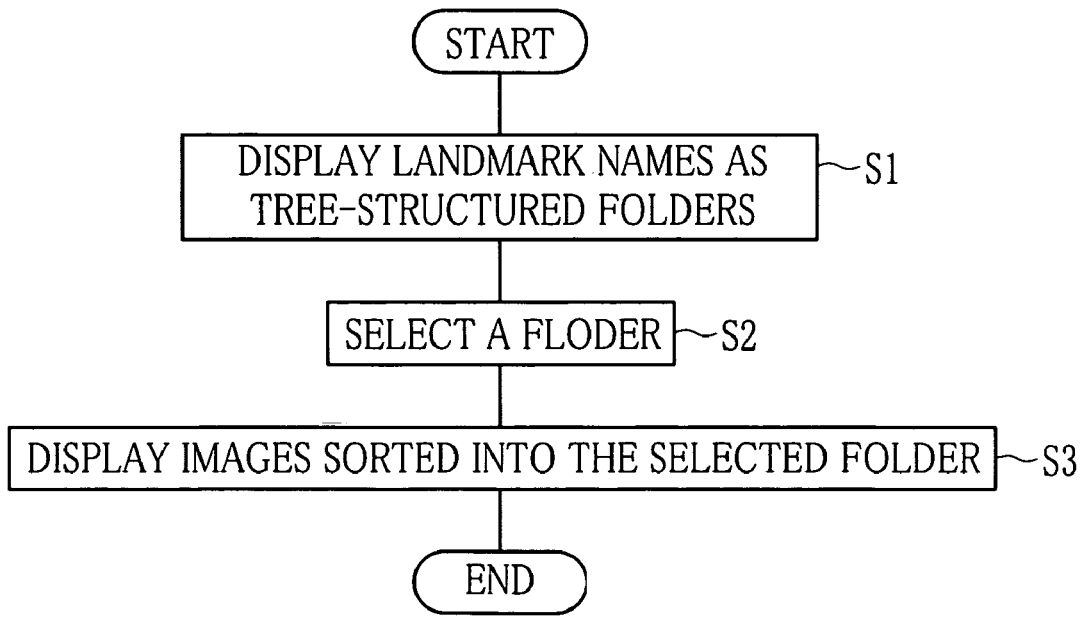
FIG. 14 is a flow chart illustrating a sequence of displaying the image data in a condition sorted according to the landmarks.

FIG.14 shows a sequence of sorting and displaying the image data stored in the ROM 24. In response to a keyword for image-searching is entered through the operating section 27, the CPU 23 activates the image search program, so the LCD 6 displays the image search screen 30, as shown in FIG.11. The CPU 23 sorts the image data according to the LM name data, to display results of the sorting on the image search screen 30. For example, the sort and select section 32 displays the tree-structured folders named city α, the folder named city θ, and the folder for unidentified places (S1).

When the operating section 27 is operated to open the folder named city α, the folder named station α, the folder named theme park α, the folder named Ferris wheel β, and the folder named roller coaster γ are displayed on the sort and select section 32, and the thumbnails of all those image data which are sorted into these folders are displayed on the image index section 33 (S3). If the folder named Ferris wheel is selected, the thumbnails of all image data sorted into this folder are displayed on the image index section 33.

Figure 15:
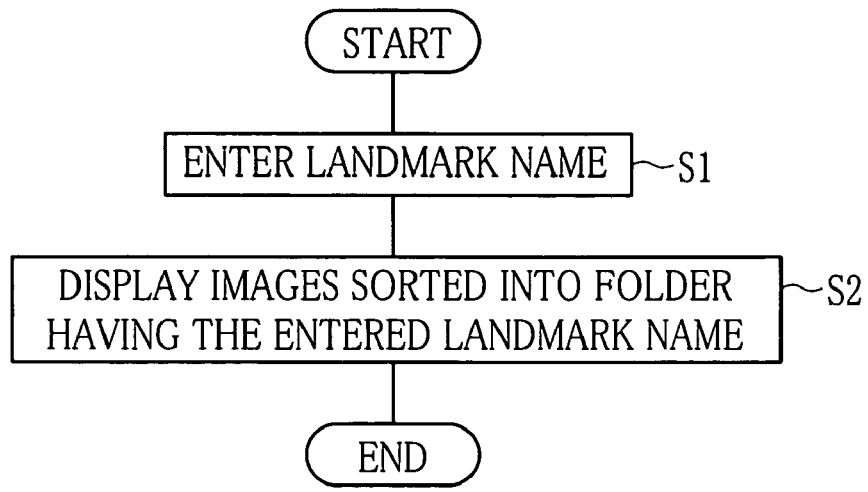
FIG. 15 is a flow chart illustrating a sequence of displaying those image data which are sorted into a group relating to a landmark entered by an operator.

FIG. 15 shows a sequence of retrieving image data by entering a place-name. When the place-name, e.g. Ferris wheel β, is entered as a keyword in the keyword entry box 31a, and then the search start button 31b is operated (S1), the CPU 23 sorts out the image data that are sorted into the folder for the Ferris wheel β, and lets the thumbnails of the sorted image data on the image index section 33 (S2).

Figure 16:
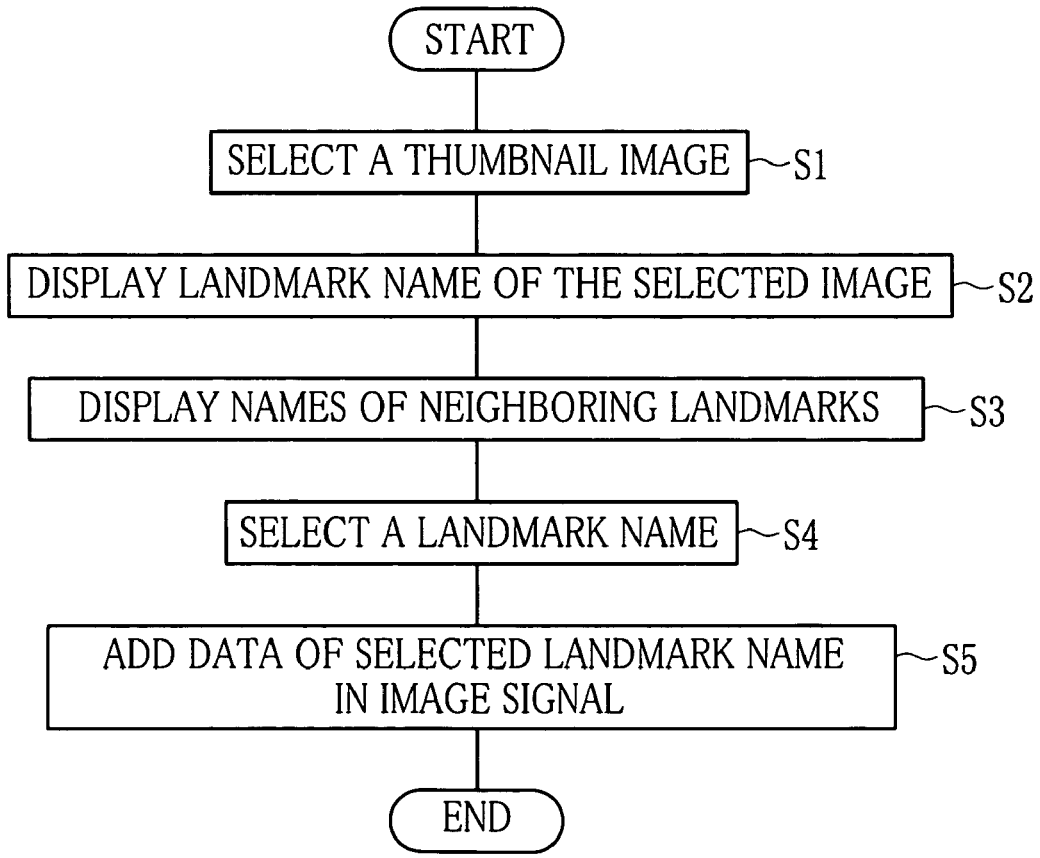
FIG. 16 is a flow chart illustrating a sequence of changing landmark data written in the image data, to change the group into which the image data is sorted.

FIG.16 shows a sequence of changing the LM name data written in the image data.

When one of the thumbnails is chosen on the image index section 33 by operating the operating section 27 (S1), the LCD 6 displays image display screen 35. The image display section 36 displays an enlarged image of the chosen thumbnail, while the landmark name display box 37a displays a landmark name that is designated by landmark name data memorized in the image data of the image presently displayed on the image display section 36 (S2), and the name choice section 37b displays a list of the names of neighboring landmarks sequentially from the nearest to the landmark whose name is displayed in the landmark name display box 37a (S3).

When the operating section 27 is operated to choose one from the landmark names displayed in the name choice section 37b (S4), the chosen landmark name is displayed in the landmark name display box 37a. By operating the landmark name revise button 37c in this condition, the CPU 23 writes the LM name data of the landmark name as displayed on the landmark name display box 37a, in the image data of the image as displayed on the image display section 36. Thereafter, the CPU 23 rewrites the image data on the ROM 24 (S5). In this way, it is possible to revise the LM name data as written in the image data, and thus change the folder of the selected image data.

As described so far, by choosing one from the landmark names on the landmark name choice section 37b, and operating the landmark name revise button 37c while the chosen landmark name is displayed on the LM name display box 37a, the LM name data of the chosen landmark is written in the image data in place of the already written LM name data. Thus, the LM name data as written in the image data is revised, and then the image data with the new LM name data is rewritten on the ROM 24. Accordingly, it is possible to correct the LM name data if the landmark name does not coincide with the image displayed on the image display section 36.

Since the image data are sorted according to the LM name data, and the results of sorting are displayed as the folder tree on the image search screen 30, it is easy to confirm the landmark names as the results of sorting.

Furthermore, the image searching section 31 allows the operator to enter a keyword in the keyword entry box 31a and operate the search start button 31b through the operating section 27, so that the image data relating to the entered keyword are retrieved from the ROM 24, and displayed as thumbnails on the image index section 33. Simultaneously, the folder, which the retrieved image data are sorted into, and the folders relating to this folder are displayed on the sort and select section 32. Therefore, even where there are a lot of image folders, the image sorting apparatus 20 can quickly retrieve an expected image folder just by entering the name of the expected folder, i.e. the name of a particular landmark or place, in the keyword entry box 31a.

Note that the definition of the landmarks or folders to be displayed in the name choice section 37b is not limited to the above embodiment, but may be modified appropriately.

Figure 17:
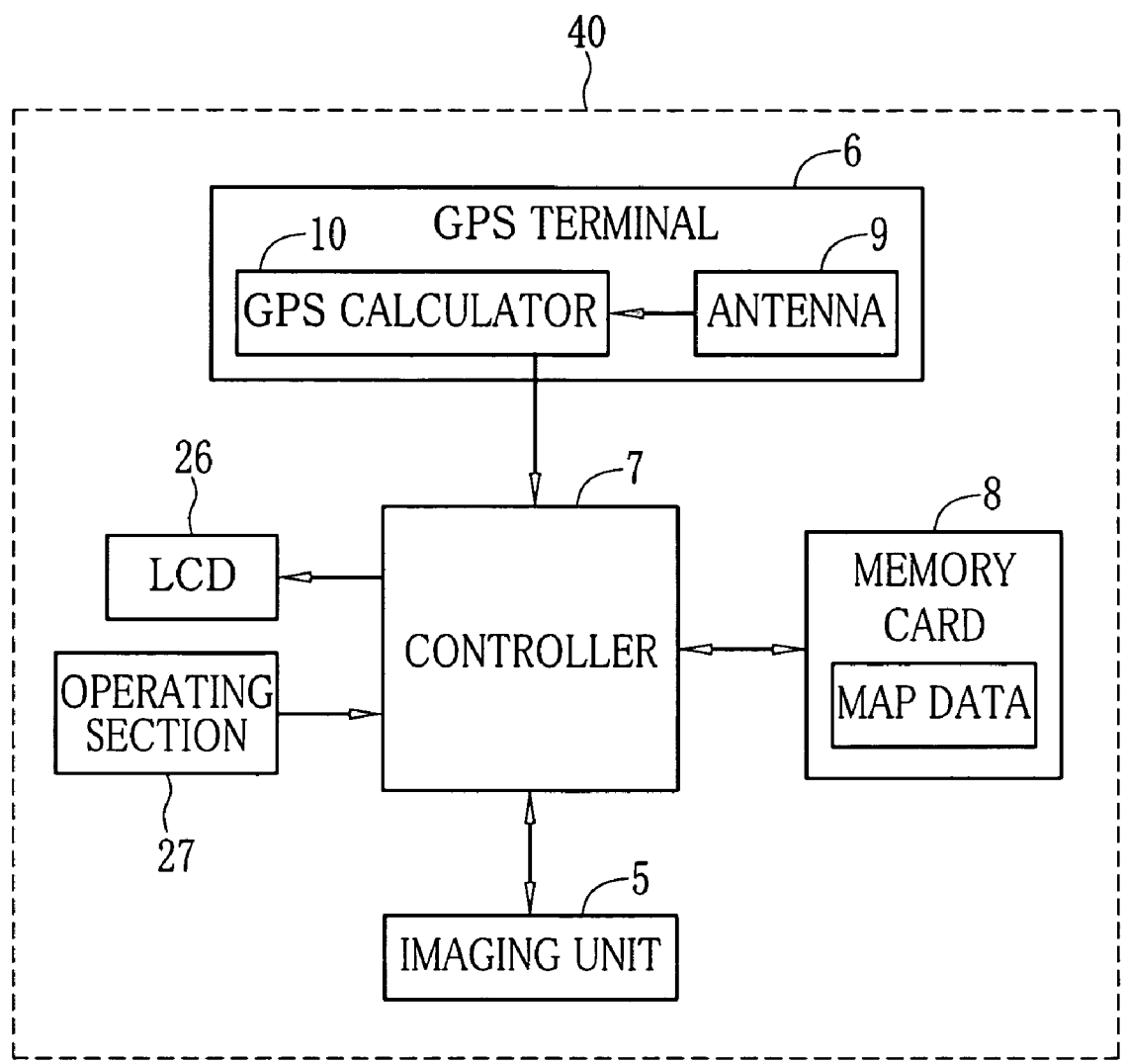
FIG. 17 is a block diagram illustrating a digital camera that functions as an image sorting apparatus, according to a further embodiment of the present invention.

FIG.17 shows a digital camera 40 according to an embodiment of the present invention, wherein equivalent components to those of the above embodiments are designated by the same reference numerals, so the detailed description of these components will be omitted to avoid redundancy.

The digital camera 40 is provided with a LCD 26 and an operating section 27, and a memory card 8 stores the map data. A controller 7 has the same function as the CPU 23 of the embodiment shown in FIG.10, so the controller 7 searches for a landmark relating to the position data, writes the LM name data of the finally selected landmark in the image data, and then rewrites the image data on the memory card 8. The controller 7 reads the image data from the memory card 8, and sorts them according to the LM name data, to display the results of sorting on an image search screen 30 of the LCD 26. That is, the digital camera 40 has the same function as the image sorting apparatus 20 of the above embodiment.

Since the digital camera 40 is provided with the image sorting function, it becomes possible to sort the image data by the digital camera 40 alone. Since the memory card 8 is rewritable, it is easy to revise the map data.

Figure 18:
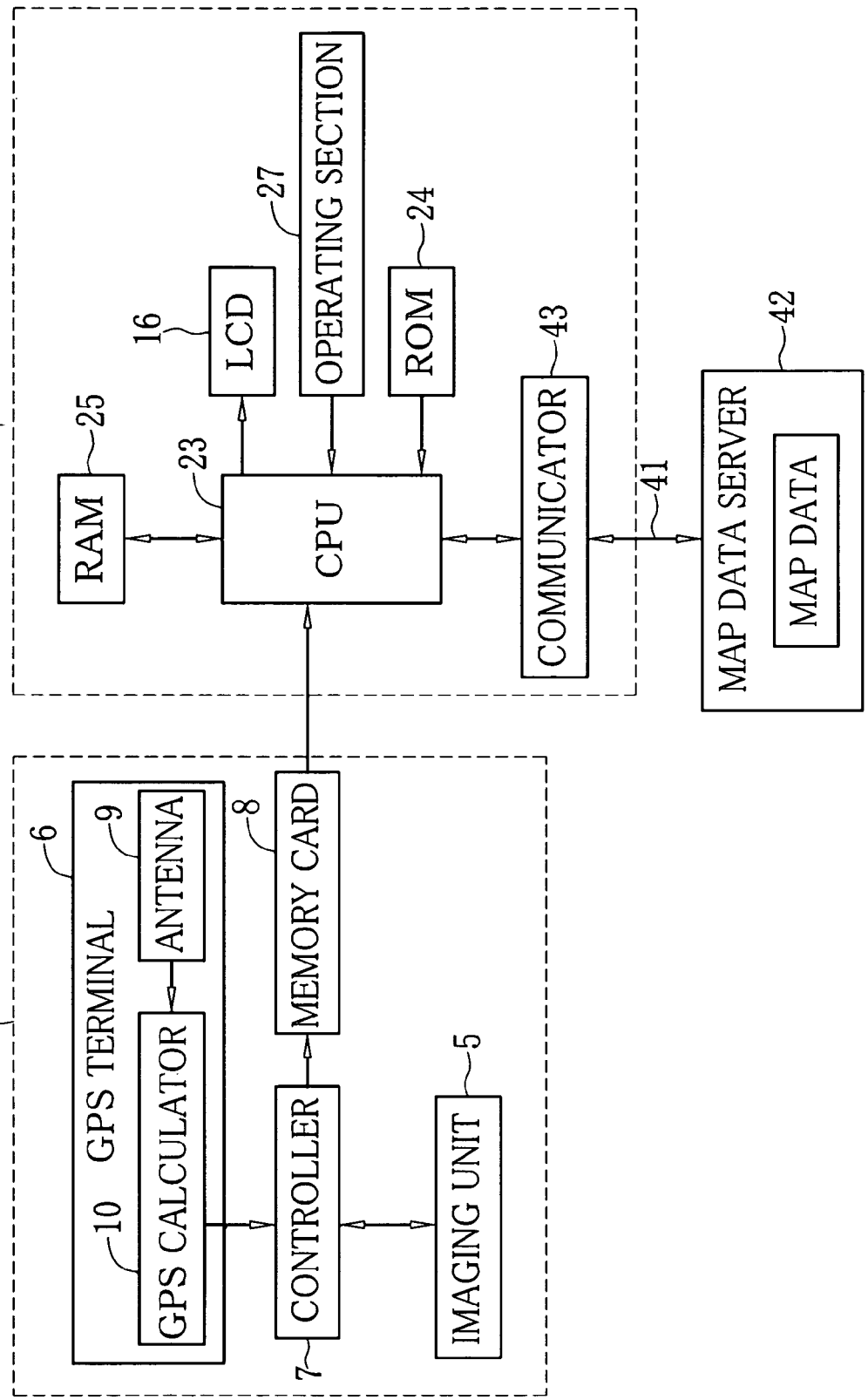
FIG. 18 is a block diagram illustrating a digital camera and an image sorting apparatus that is connectable to a map data server through the Internet, according to still another embodiment of the present invention.

FIG.18 shows a further embodiment of the present invention, wherein an image sorting apparatus 20 is provided with a communicator 43 that is connectable to a map data server 42 through the Internet 41. The map data server 42 stores such map data as described in the above embodiment, and is installed in a map data managing organization or the like that manages the map data. The map data stored in the map data server 42 is always revised to be the latest ones.

According to this embodiment, the CPU 23 communicates with the map data server 42 through the communicator 43 and the Internet 41, and searches the map data of the map data server 42 based on position data of designated image data, to retrieve LM name data that correspond to the position data. Then the CPU 23 writes the retrieved LM name data in the designated image data, and then writes the image data on the ROM 24.

Since the image sorting apparatus 20 of the embodiment of FIG.18 is connectable to the map data server 42 through the communicator 43 and the Internet 41, to retrieve the LM name data relating to the position data of the image data from the latest map data stored in the map data server 42, the image sorting apparatus 20 can identify the imaged landmarks without fail, even they are newly built ones.

Also, the personal computer 4 of the landmark search system 2 or the digital camera 40 may be provided with a communicator that is connectable to the map data server via the Internet. Then, instead of storing the map data in the ROM 12 or the memory card 8, the CPU 11 or the controller 7 is connected to the map data server through the communicator and the Internet, to search the map data of the map data server for retrieving LM name data that correspond to the image data. The same advantage as above will be achieved in these cases.

Although the present invention has been described with respect to the preferred embodiments, the present invention is not to be limited to the above embodiments but, on the contrary, various modifications will be possible without departing from the scope of claims appended hereto.

What is claimed is:

1. A landmark search system, comprising:
a digital camera comprising a position data obtaining device for obtaining position data of a camera position at which an image is captured, and a data storage device for storing said position data in association with image data of the captured image;
a map data storage device storing map data, said map data comprising area data of divisional areas which are provided by dividing a map area at regular intervals of a latitude and a longitude, and place data prepared for each of said divisional areas, said place data including data of landmarks located in each of said divisional areas; and
a search device that searches said map data based on said position data, to select one divisional area that includes the camera position, and thereafter retrieve said place data for the selected divisional area, to determine a landmark that corresponds to the camera position.

2. A landmark search system as claimed in claim 1, wherein said place data comprises landmark name data and landmark area data.

3. A landmark search system as claimed in claim 2, wherein said landmark area data comprises data of latitudes and longitudes of vertexes of polygonal areas that outline actual areas of respective landmarks.

4. A landmark search system as claimed in claim 3, wherein said landmark area data further comprises data of an extended area that is extended in all directions by a predetermined width from each of said polygonal areas.

5. A landmark search system as claimed in claim 1, wherein said place data further comprises data of an inclusive relation between those landmarks, of which one is included in an area of another.

6. A landmark search system as claimed in claim 1, further comprising a data storage device for storing data of the determined landmark in association with image data of the captured image.

7. A landmark search system as claimed in claim 1, further comprising a display device for displaying results of a search by said search device.

8. A landmark search system as claimed in claim 1, wherein said position data obtaining device comprises a GPS (global positioning system) terminal.

9. A search method for retrieving data of a landmark that corresponds to a camera position at which an image is captured by a digital camera, said method comprising:
preparing map data that comprises area data of divisional areas which are provided by dividing a map area at regular intervals of a latitude and a longitude, and place data prepared for each of said divisional areas, as executed by a processing unit on a computer, said place data including data of landmarks located in each of said divisional areas;
obtaining position data of the camera position;
searching said map data based on said position data, to select one divisional area that includes the camera position; and
thereafter retrieving said place data for the selected divisional area, to determine the landmark that corresponds to the camera position.

10. A search method as claimed in claim 9, wherein said place data comprises landmark name data and landmark area data.

11. A search method as claimed in claim 10, wherein said landmark area data comprises data of latitudes and longitudes of vertexes of polygonal areas that outline actual areas of respective landmarks.

12. A search method as claimed in claim 11, wherein said landmark area data further comprises data of an extended area that is extended in all directions by a predetermined width from each of said polygonal areas.

13. A search method as claimed in claim 9, wherein said place data further comprises data of an inclusive relation between those landmarks, of which one is included in an area of another.

14. A search method as claimed in claim 9, wherein said position data is obtained through a global positioning system.

15. A device for retrieving data, said device comprising:
a search device that searches map data to retrieve data of a landmark that corresponds to a camera position at which an image is captured, said map data comprising area data of divisional areas which are provided by dividing a map area at regular intervals of a latitude and a longitude, and place data prepared for each of said divisional areas, said place data including data of landmarks located in each of said divisional areas,
wherein said place data further comprises data of an inclusive relation between the landmarks, of which one is included in an area of another.

16. The device of claim 15, wherein said place data comprises landmark name data and landmark area data.

17. The device of claim 16, wherein said landmark area data comprises data of latitudes and longitudes of vertexes of polygonal areas that outline actual areas of respective landmarks.

18. The device of claim 17, wherein said landmark area data further comprises data of an extended area that is extended in all directions by a predetermined width from each of said polygonal areas.

19. The device of claim 15, wherein the inclusive relation between the landmarks comprises a parent-affiliate relation between the landmarks.

20. The device of claim 15, wherein the map data further comprises a landmark data table which stores the place data comprising parent data and affiliate data of respective ones of the landmarks.

21. The device of claim 15, wherein the search device selects one divisional area that includes the camera position, and thereafter retrieves said place data for the selected divisional area, to determine a landmark that corresponds to the camera position.

* * * * *